Mar. 6, 1923. Re. 15,558

A. A. QUICK

DEVICE FOR HAULAGE OR STRAINING PURPOSES

Original Filed Jan. 31, 1919 2 sheets-sheet 1

Inventor

A. A. Quick,

By Marks & Clerk

Attorneys

Mar. 6, 1923. Re. 15,558

A. A. QUICK

DEVICE FOR HAULAGE OR STRAINING PURPOSES

Original Filed Jan. 31, 1919 2 sheets-sheet 2

Inventor
A. A. Quick,
By Marks & Clerk
Attorneys

Reissued Mar. 6, 1923.

Re. 15,558

UNITED STATES PATENT OFFICE.

ALFRED ARTHUR QUICK, OF MELBOURNE, VICTORIA, AUSTRALIA.

DEVICE FOR HAULAGE OR STRAINING PURPOSES.

Original No. 1,381,011, dated June 7, 1921, Serial No. 274,204, filed January 31, 1919. Application for reissue filed January 31, 1923. Serial No. 616,190.

*To all whom it may concern:*

Be it known that ALFRED ARTHUR QUICK, subject of the King of Great Britain, and a resident of "Ben Arthur," 75 Penders Street Thornbury, Melbourne, in the State of Victoria, Commonwealth of Australia, has invented certain new and useful Improvements in a Device for Haulage or Straining Purposes, of which the following is a specification.

This invention relates to improvements in hauling or straining devices and refers especially to devices of that class in which comparatively long lengths of rope or like flexible members may be operated upon without having to provide a winding drum of sufficient capacity to accommodate the whole length of rope hauled.

Ordinarily, the hauling or straining rope is either wound around the drum of a winch which is sufficiently large to accommodate the same or as in the case of a warping drum the rope is passed around the drum of the winch for several turns and then led off the same. In the latter case the load is maintained by means of the frictional contact between the rope and the said drum and for the purpose of causing the rope to frictionally grip the drum it is necessary to maintain a tension upon the rope after it has been led off therefrom. This tension is usually caused by pulling on the rope by hand or by the use of counter weights or the like, such means limiting the load holding capacity of the friction drum owing to the fact that the said tension has no fixed relationship to the load.

Moreover it has been proposed to pass a rope to and give it one or more turns around the drum of a winch the end of the rope passing off from the opposite side of the drum being looped around a pulley and then secured to the frame or other part of the winch, whereby when the drum is rotated to move along the rope away from the pulley the loop will be lengthened and a strain applied to that part of the rope leading to the drum.

I am also aware that it has been proposed to employ pulleys or blocks in combination with the device above described to increase the purchase of hauling strain. The disadvantage of this form of hauling device is that it will not work satisfactorily under very heavy loads as the "bite" and side creep on the rope incident to the movement set up as it pays on and pays off the drum causes excessive wear and thereby renders the effective life of the rope of very short duration.

The object of this invention is to provide a hauling and straining device in which the advantages of lightness of construction as obtains with a warping drum or the like is applied to and relatively the same purposes effected as is achieved with a winding drum.

I accomplish this object by providing a novel combination of known devices consisting of a rotatable winch, a rope and one or more blocks arranged and operating in such a manner that as the load is applied to the rope leading on to the winch a proportional tension is automatically applied to that part of the said rope as it pays off therefrom and this tension increases or decreases proportionately with any increase or decrease in the load or strain on the said rope to insure the said rope having an effective frictional contact with the said winch.

The invention consists more particularly in providing a length of rope one end of which is secured to and passes from a snatch block to and around a second snatch block to and around a winch, through the first snatch block and back to the frame of the winch or to an anchorage. The frame of the winch is connected to an anchorage and the second snatch block is connected to a hauling rope or the position of the said anchorage and hauling ropes may be reversed.

In a hauling or straining device constructed in accordance with this invention the rope does not take one complete turn around the winch or any of the blocks or pulleys as it pays on or off the same and in consequence all bite and side creep is eliminated and the rope will have a longer life.

For the purpose of convenience in the description of this invention as hereinafter set out certain terms are employed which it will be understood are intended to be read as embracing their equivalents.

In this specification:—

The term "rope" will include any other suitable flexible member such as a chain, cable, belt or the like, and vice-versa.

The term "winch" will include and rotatable drum, barrel, or the like, and vice-versa.

The term "block" will include a snatch-block, pulley, sheave, bollard or any other device around which a rope is adapted to pass freely and the term may even include the load itself when it is of a cylindrical form such as a log or barrel, and vice-versa.

In the operation of a hauling device constructed according to this invention the position of the load and the anchorage may be transposed and it will be clear that in the following description where it is stated that one member or part of a member is connected to a load and the other member or part of a member is connected to an anchorage the same effect may be obtained by transposing the said load and anchorage and that the said terms are therefore transposable.

I will now describe with the aid of the accompanying drawings several different constructions embodying the present invention, but it will be understood that I do not wish to confine myself to the precise constructions and arrangement of parts described and shown as these are given by way of example only.

In these drawings;—

Figure 1:
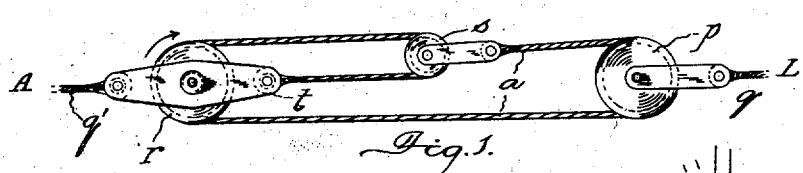
Figure 1 is a view in side elevation of the invention.

Referring to Fig. 1 of the drawings, the reference letter $p$ designates a block which is attached, as by a rope $q$, to the load L and this block will hereinafter be referred to as the first block. The operating winch which in this instance may comprise a pulley $r$ rotatably mounted in a frame is secured to an anchorage A by means of a rope $q'$. A second block $s$ is attached to one end of the operating rope $a$ and the opposite end of the rope is reeved through the first block $p$, then led on to and caused to take a half turn on the operating winch. The rope is led from the pulley $r$ and reeved through the second block and its end is attached to the frame $t$ of the winch or any other fixed object.

Figure 2:
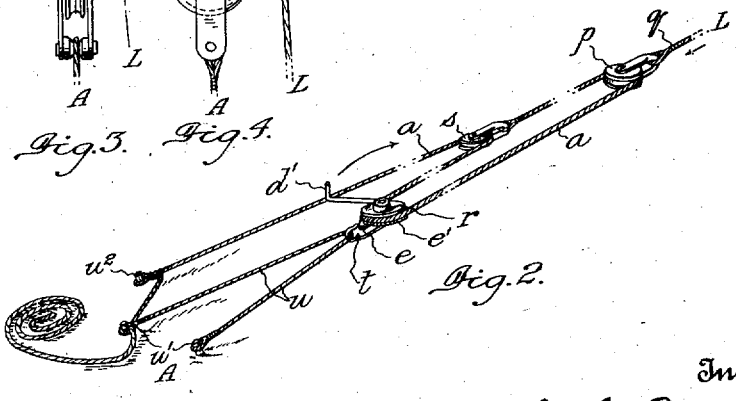
Figure 2 is a view in perspective of one arrangement of the parts of the invention adapted particularly for effecting hauling operations.

In Fig. 2 of the drawings there is shown a practical application of a modification of the invention and in this view the said device is set up to effect a hauling strain on the load rope $q$ which may be connected to a heavy object to be moved.

The frame $t$ of the winch in this instance is shown connected by a looped rope $u$ to anchor stakes $u'$ driven in the ground but it will be obvious that any other form of anchorage may be used. The end of the rope $a$ is fastened to a third stake $u^2$ in such a way that it can be easily loosened and again fastened when it is desired to adjust the rope or to reset the device if it is desired to take a second pull on the object to be moved. The winch is operated by a lever $d'$ and a pawl $e$ and ratchet $e'$ are employed to hold the pulley $r$ in a position to retain any strain applied to the rope.

In operation the second block $s$ is placed near the pulley $r$ and the said pulley is operated in the direction of the arrow to cause the second block to be drawn toward the first block $p$. The strain on that end of the rope $a$ attached to the frame of the winch or to the anchor stake $u^2$ is equal to half the strain on the other end of the said rope and as the whole length of the rope is under tension the frictional contact between it and the pulley $r$ causes the load to be moved when the said drum is operated.

When the block $s$ is near the winch the rope between the winch and the block $p$ is double, and when the device has been operated to draw the block $s$ away from the winch and near to the block $p$ the rope is trebled thereby resulting in a reduction of the distance between the winch and the said block $p$ by approximately one third without in any way shortening the rope.

The difference in the tension on that part of the rope paying on, and on that part paying off the winch remains proportionately the same no matter how much the haulage strain is increased or decreased within working limits.

Either or both of the blocks $s$ and $p$ may be designed so as to be operated in conjunction with or in lieu of the winch to effect the operation of the device.

Figures 3, 4:
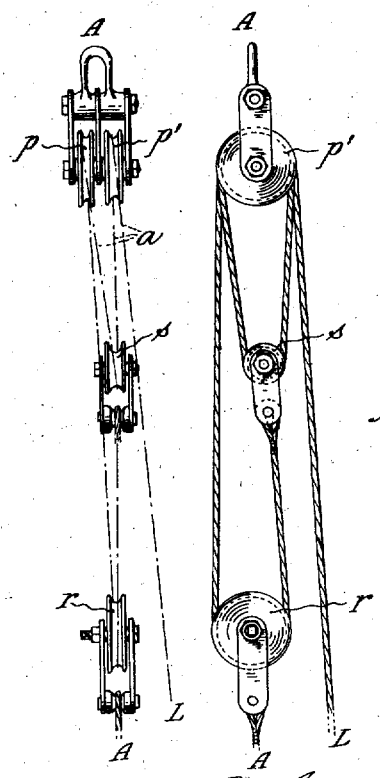
Figs. 3 and 4 are edge and side views, respectively, of a modification of the invention.

A further adaption of the device is shown in Figs. 3 and 4 of the drawings and in these views a double block is used provided with pulleys $p$ and $p'$. In the arrangement of the parts shown in these views an end of the rope $a$ passes from the second block $s$ to and is taken around the winch $r$, up to and over the pulley $p$, down to and around pulley $s$, up to and around the pulley $p'$ and then fastened to the load L. This form of the invention operates precisely as that above described with the difference that both the double block and the winch $r$ are secured to separate anchorage means and do not move toward each other when a strain is applied to the rope and the pulley of the block *s* does not rotate. The operation of the winch *r* causes the second block *s* to be drawn away from the double block and the load is moved upward.

From the foregoing description of the invention it will be appreciated that when the arrangements shown in Figs. 1 and 2 of the drawings are in operation, the strain on those parts of the rope paying off the blocks *s* and *p* is slightly less than the strain on those parts of the rope paying on to the said blocks and the differences in the strain at these points are caused by the friction set up in the moving parts of the said blocks. When the devices are not in operation the differences in the strains on the parts of the rope are equalized by the blocks automatically adjusting themselves to balance the said strains.

When the mechanical efficiency of the device is considerably reduced by friction of the moving parts or the co-efficient of friction between the surfaces of the drum and the rope is not sufficient for the purpose, the rope will not grip the drum with sufficient force to carry the strain due to the load.

In order to increase the frictional contact of the rope upon the drum of the operating winch, I may form rope grooves with inclined sides upon the said drum and to provide an additional gripping means for increasing the friction or grip I may employ a shoe or the like and arrange it to press upon the rope passing around the drum.

The peripheries of the drums can be provided with a number of flat surfaces which also will help to prevent the rope slipping therearound when the device is in operation.

Figure 5:
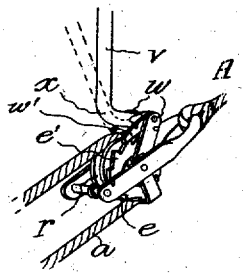
Fig. 5 is a view in perspective of a winch designed for use with the invention.
Figure 8:
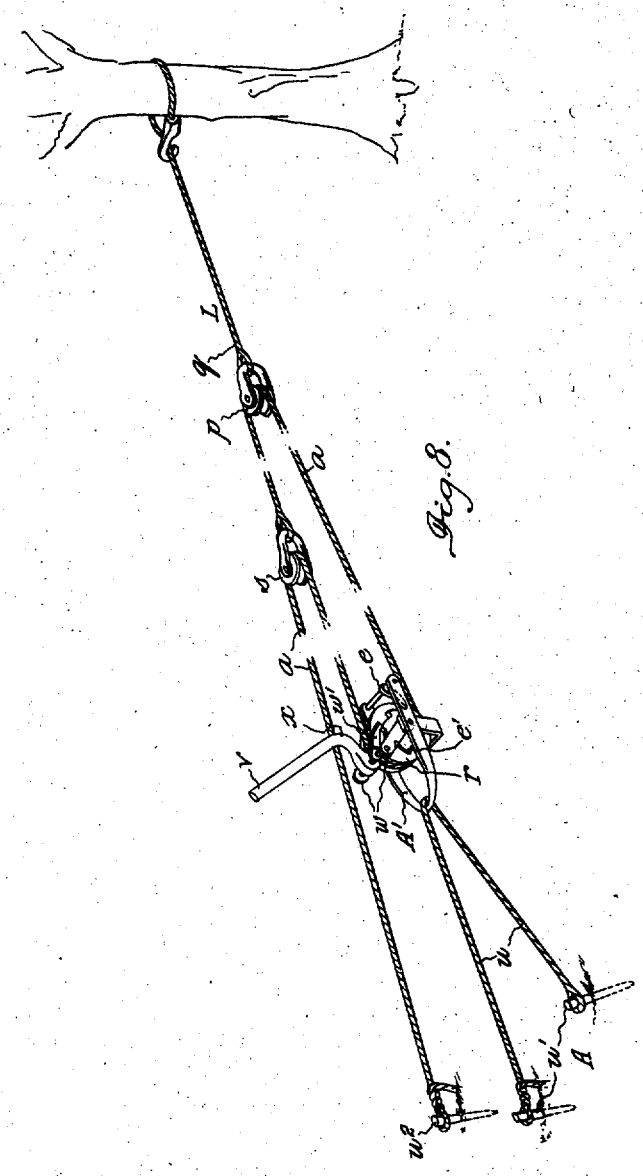
Fig. 8 is a perspective view of the arrangement shown in Fig. 2 with the winch shown in Fig. 5 applied.

In Fig. 8 there is combined the arrangement shown in Fig. 2 and the winch shown in Fig. 5. In this instance the winch generally designated A′ is substituted for the winch *r* and the ropes A, L, *a*, *q* and *u* are arranged the same as in Fig. 2 of the drawings.

In Fig. 5 of the drawings the winch is shown operated by a lever *v* which is carried by links *w* pivoted to the frame and this lever is formed with a cranked or bent portion *x* arranged to bear on the rope passing around the pulley *r* when the said lever is operated. The pressure of the lever on the rope prevents the rope slipping should there be any tendency for it to do so due to the blocks not moving freely and resulting in a decrease in the strain on that part of the rope paying off therefrom. One of the links *w* is fitted with a pawl *w′* for engaging the ratchet *e′* on the drum of the winch and a retaining pawl *e* is fitted to the frame of the said winch for preventing any backward movement.

Figure 6:
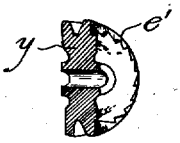
Figs. 6 and 7 are views in perspective illustrating different forms of winding drums adapted for use with the invention and hereinafter are fully described.
Figure 7:
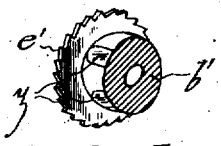

In Fig. 6 is shown a winch pulley *y* having a tapered rope groove formed therein and in Fig. 7 is shown part of a winch drum having flat surfaces *z* designed to assist in preventing the slipping of the rope therearound when a strain is applied thereto.

The winch may by the employment of suitable gear be capable of being driven by hand power, motive power or animal power.

In the following claims wherever the terms "anchorage" or "load", or the terms "strain" or "tension" are used it will be understood that they may be transposed or substituted one for the other.

I claim:—

1. A hauling or straining device comprising a winch, a pair of snatch blocks, a rope having one end connected to the frame of one of the snatch blocks and its opposite end reeved through the second snatch block, around the winch, through the first snatch block, and then secured to an anchorage, and means for adjustably securing the free end of the rope, substantially as described.

2. A hauling or straining device comprising a winch, a pair of snatch blocks, a rope having one end connected to one of the snatch blocks, and its opposite end reeved through the second snatch block, around the winch, through the first snach block and then secured to an anchorage, means for anchoring the winch, and a load rope for connecting the load to the second snatch block, so arranged that when the winch is operating the rope is drawn through the second snatch block onto the winch and pays off therefrom, to permit the first snatch block to be drawn toward the second snatch block substantially as described.

3. A hauling or straining device comprising a winch, a pair of snatch blocks, a rope having one end connected to the frame of one of the snatch blocks and its opposite end reeved through the second snatch block, around the winch and then through the first snatch block, means for adjustably securing the free end of the rope, means for anchoring the winch and for connecting a load to the second snatch block, means for operating the winch, and means for increasing the frictional contact between the rope and the winch, when the latter is operated substantially as described.

4. A hauling and straining device comprising a winch, having means for securing the same to an anchorage, a rope taking half or more than half a turn around the drum of the winch and have a noose thereon, a lever for operating the winch, a ratchet on the drum of the winch, a pawl adapted to engage with the ratchet, a snatch block attached to one end of the rope and means for securing the opposite end thereof, a second snatch block located in the noose on the rope, means for connecting the second snatch block to the load and means for pressing the rope on the drum of the winch when the same is operated, substantially as described.

5. In a hauling or straining device of the class described a winch comprising a frame, a winding drum rotatably mounted in the frame, a ratchet on the drum and a pawl on the frame for holding the winding drum against backward movement, a lever having a cranked or bent portion adapted to bear on a rope passing around the drum, links connecting the lever to the frame, and a pawl on the links adapted to engage with the ratchet to rotate the winding drum, substantially as described.

In testimony whereof he has affixed his signature.

ALFRED ARTHUR QUICK.

Witnesses:
J. W. Mansfield,
William A. Ashton.